United States Patent
Narita

(10) Patent No.: US 9,024,591 B2
(45) Date of Patent: May 5, 2015

(54) ELECTRIC ACTUATOR

(71) Applicant: Azbil Corporation, Tokyo (JP)

(72) Inventor: Hiroaki Narita, Tokyo (JP)

(73) Assignee: Azbil Corporation, Tokyo (JP)

(*) Notice: Subject to any disclaimer, the term of this patent is extended or adjusted under 35 U.S.C. 154(b) by 394 days.

(21) Appl. No.: 13/666,955

(22) Filed: Nov. 1, 2012

(65) Prior Publication Data

US 2013/0113440 A1 May 9, 2013

(30) Foreign Application Priority Data

Nov. 4, 2011 (JP) .................................. 2011-242641

(51) Int. Cl.
| | |
|---|---|
| H02J 7/00 | (2006.01) |
| F16K 31/02 | (2006.01) |
| H02J 7/04 | (2006.01) |
| H02K 11/00 | (2006.01) |
| H02J 7/34 | (2006.01) |
| H02J 9/06 | (2006.01) |

(52) U.S. Cl.
CPC ............ *H02J 7/045* (2013.01); *H02K 11/0094* (2013.01); *H02J 7/345* (2013.01); *H02J 9/06* (2013.01)

(58) Field of Classification Search
CPC ........ H02J 7/345; F16K 33/00; F16K 31/042; F16K 31/046
USPC .......... 320/166, 167; 251/71, 129.01, 129.02, 251/129.11
See application file for complete search history.

(56) References Cited

U.S. PATENT DOCUMENTS 8,292,261 B2 * 10/2012 Landreau et al. ........ 251/129.01
8,924,028 B2 * 12/2014 Neilson et al. ................. 700/282

FOREIGN PATENT DOCUMENTS

| JP | 2007-218433 | 8/2007 |
|---|---|---|
| JP | 2008-089109 | 4/2008 |

* cited by examiner

*Primary Examiner* — Richard V Muralidar
(74) *Attorney, Agent, or Firm* — Troutman Sanders LLP

(57) ABSTRACT

A most recent electrostatic capacitance value for a backup capacitor is measured periodically. Each time the most recent electrostatic capacitance value is measured, a charging voltage (a required charging voltage) that is required in order to cause a return operation of a valve from the setting opening at that time to an emergency opening/closing position (for example, the fully closed position) is calculated based on the electrostatic capacitance value that has been measured, and the terminal voltage of the backup capacitor is adjusted so as to become equal to the calculated required charging voltage.

4 Claims, 14 Drawing Sheets

ELECTRIC ACTUATOR

CROSS-REFERENCE TO RELATED APPLICATION

This application claims priority to Japanese Patent Application 2011-242641 filed Nov. 4, 2011. The entirety of this application is incorporated by reference herein.

FIELD OF TECHNOLOGY

The present invention relates to an electric actuator for controlling the opening/closing of a valve through the driving force of a motor.

BACKGROUND

Conventionally, electric actuators have been used as devices for controlling the opening/closing of valves used in air-conditioning equipment, plants, and the like. In these electric actuators, the opening/closing of valves has been controlled through the driving forces of motors, with ball valves or butterfly valves, or the like, installed as valve bodies in pipelines wherein cold water or hot water, high-temperature steam, or the like, flows.

One type of electric actuator is a spring-return-type electric actuator. In this spring-return-type electric actuator, a spring is provided, as emergency opening/closing means for the valve at the time of a power outage, on the valve shaft of the valve or on an output shaft that rotates the valve shaft, where the rotational force of the motor that rotationally drives the valve is used to wind the spring at the time of normal operation, so that when there is no rotational force of the motor at the time of a power outage, an opening operation or a closing operations to an emergency opening/closing position is performed by the biasing force of the spring that has been wound. Note that the emergency opening/closing position may be set as the fully closed position, or may be set as the fully open position.

However, even though such a spring-return-type electric actuator has the benefits of performing the opening operation or the closing operation with extreme rapidity at the time of a power outage of the valve, it also has the following problem areas: (1) being relatively noisy when opening/closing; (2) requiring a motor that produces a torque that is large enough to wind the spring at the time of normal operation, increasing the amount of power consumed; (3) the spring overrunning, that is, performing in the opening operation or closing operation beyond what is necessary, at the time of the emergency opening/closing, causing substantial damage to the equipment; and so forth.

Given this, there has been a proposal for an electric actuator wherein, instead of a spring, an electric double layer capacitor is provided in the electric actuator as a backup capacitor, where, during normal operation, the backup capacitor becomes electrically charged, and where, at the time of a power outage, the valve is forcibly opened or closed through driving the electric motor with the electrical energy that is stored in the backup capacitor. (See, for example, Japanese Unexamined Patent Application Publication 2007-218433

However, the electrical energy that can be stored in the backup capacitor depends on the electrostatic capacitance of the backup capacitor, where this electrostatic capacitance is reduced through variation over time, applied voltages, temperature fluctuations, and the like, and thus even if the terminal voltage of the backup capacitor is monitored so as to always maintain a voltage value that is set in advance, if, after some time has elapsed, a power outage were to occur, there would be the risk that the electrical energy that is stored may be inadequate, producing a state wherein it is not possible to perform the desired opening operation or closing operation (a return operation).

Moreover, because it is not possible to specify what the degree of opening of the valve will be at the time of the power outage, normally it is necessary to store in the backup capacitor the amount of electrical energy required to operate from a fully open state to a fully closed state or from a fully closed state to a fully open state. In contrast, the electric actuator does not always control the valve to be in the fully closed (degree of opening=0%) or the fully open (degree of opening=100%) position, but rather often the control is to an intermediate degree of opening. Notwithstanding only needing to operate to the fully closed or fully open state from the intermediate degree of opening when there is a power outage when the valve is controlled to an intermediate degree of opening, still the amount of energy required for moving from fully open to fully closed or from fully closed to fully open is stored in the backup capacitor. Because of this, an excessive amount of electrical energy is stored in the backup capacitor (it is overcharged), which not only interferes with energy conservation, but also reduces the service life of the backup capacitor.

Moreover, Japanese Unexamined Patent Application Publication 2008-89109 discloses charging a backup capacitor with only the electric power required for the opening operation or closing operation of the valve at the time of a power outage. However, based on the disclosure, even if the amount of electric power required for the opening operation or the closing operation to the emergency opening/closing position from the current opening position of the valve is calculated and the backup capacitor is charged with that amount of electric power, still there would be declining electrostatic capacitance of the backup capacitor due to changes over time, the applied voltages, variations in temperature, and the like, so that there would not always be an appropriate amount of electrical energy stored in the backup capacitor, with the risk that it might not be possible to perform the desired opening operation or closing operation (return operation).

The present invention was created in order to resolve such issues, and the object thereof is to provide an electric actuator that is able to perform reliably the desired return operation, regardless of when a power outage occurs, while always storing an appropriate amount of electrical energy in the backup capacitor.

SUMMARY

In order to achieve the object set forth above, examples of the present invention are an electric actuator including a motor for receiving a supply of electric power from a power supply portion and for driving a valve, and a backup capacitor that is charged through the receipt of electric power from the power supply, for performing a return operation, at the time of a power outage, on the valve to a prescribed opening position through forcibly driving the motor through electrical energy that is stored in the backup capacitor, having electrostatic capacitance measuring means for measuring periodically a most recent electrostatic capacitance value for the backup capacitor; and charging voltage calculating and adjusting means for calculating, as a required charging voltage, a charging voltage for the backup capacitor that is required in order to cause the return operation of the valve from the opening setting value at that time to the prescribed opening position, based on the measured most recent electrostatic capacitance value, each time the most recent electrostatic capacitance value of the backup capacitor is measured and for adjusting the terminal voltage of the backup capacitor so as to become equal to the calculated required charging voltage.

Given examples of the present invention, the most recent electrostatic capacitance value is measured periodically for the backup capacitor, and each time the most recent electrostatic capacitance value for the backup capacitor is measured, the charging voltage of the backup capacitor required for causing the valve to undergo the return operation from the opening setting value at that time to the prescribed opening position (the emergency opening/closing position) is calculated, as the required charging voltage, based on the most recent electrostatic capacitance value that has been measured, and the terminal voltage of the backup capacitor is adjusted so as to become equal to the required charging voltage that has been calculated.

In the examples of the present invention, the most recent electrostatic capacitance value for the backup capacitor is calculated, for example, as follows. The electrical energy that is stored in the backup capacitor is discharged at a prescribed discharging current value Ib, the terminal voltage of the backup capacitor, which falls due to the discharge, is monitored, a time T1 since the commencement of discharge, at the point in time wherein the terminal voltage reaches a specific voltage value V1, and a time T2 since the commencement of discharge, at the point in time at which a specific voltage value V2, which is set to be a value that is lower than the voltage value V1, is reached, are measured, and the most recent electrostatic capacitance value Cnew of the backup capacitor is calculated based on these measured times T1 and T2, the discharging current value Ib, and the voltage values V1 and V2. For example, the most recent electrostatic capacitance value Cnew is calculated as Cnew=Ib·(T2−T1)/(V1−V2).

Moreover, in the examples of the present invention the required charging time for the backup capacitor is calculated, for example, as follows. With the motor power as P, the total driving time from the valve being fully closed to the valve being fully open as Ta, the valve opening setting value as θsp, the total rotational angle from the valve being fully closed to the valve being fully open as θa, and the most recent electrostatic capacitance value of the backup capacitor as Cnew, then the required charging voltage VCmin is calculated as VCmin=(2P·Ta·θsp/(Cnew·θa))$^{1/2}$.

In the examples of the present invention, the most recent electrostatic capacitance value of the backup capacitor is measured periodically, and each time the most recent electrostatic capacitance value of the backup capacitor is measured, the charging voltage of the backup capacitor that is required in order to cause a return operation of the valve from the opening setting value at that time to a prescribed position is calculated, as the required charging voltage, based on the most recent electrostatic capacitance value that has been measured, and the terminal voltage of the backup capacitor is adjusted so as to go to the required charging voltage that has been calculated, thus making it possible to ensure the reliability of the desired return operation, regardless of when a power outage may occur, while storing an appropriate amount of electrical energy in the backup capacitor.

DETAILED DESCRIPTION

Figure 1:
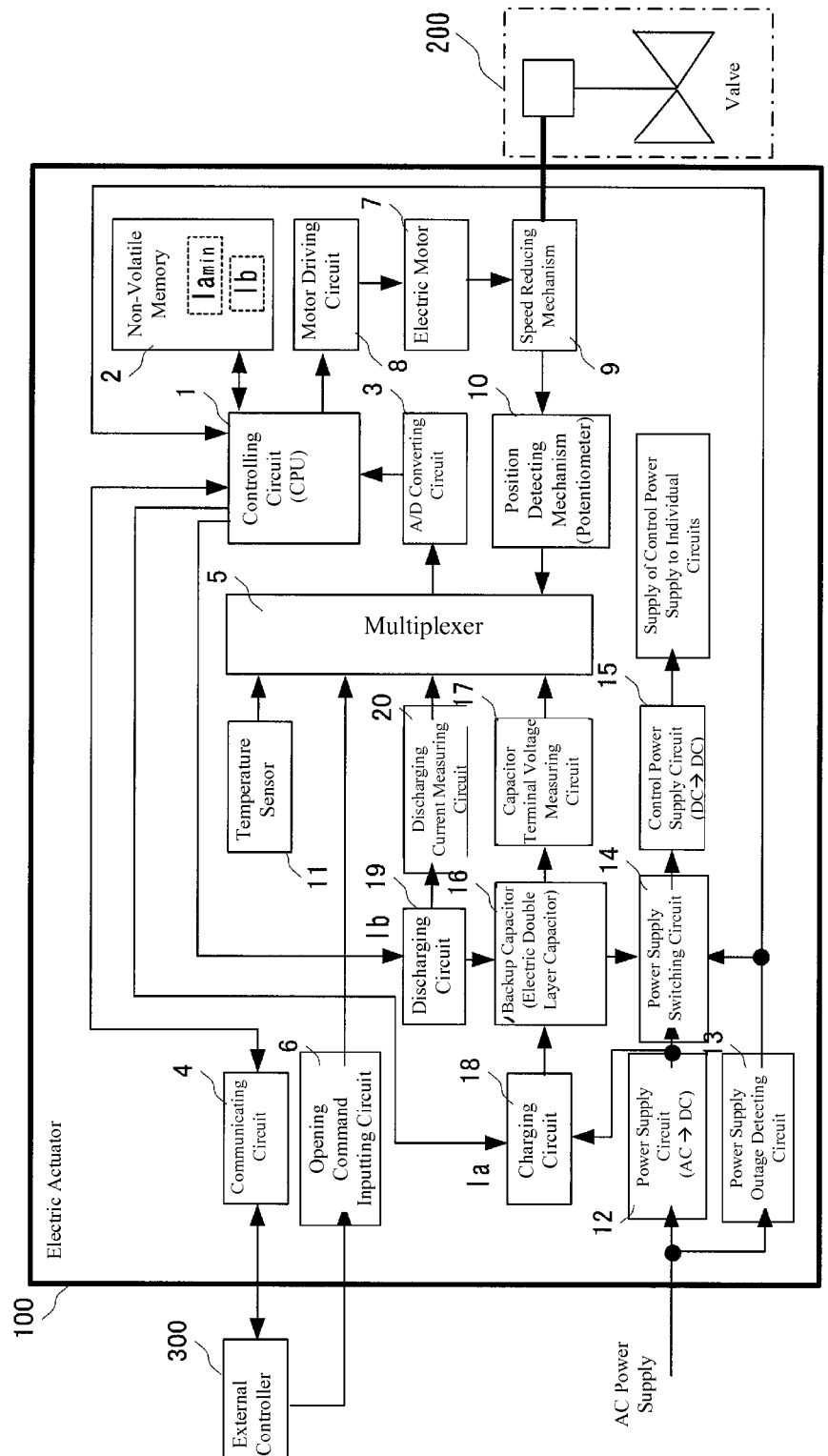
FIG. 1 is a block diagram illustrating portions of an example of an electric actuator according to the present invention.

Examples of the present invention are explained in detail below based on the drawings. FIG. 1 is a block diagram illustrating portions of an example of an electric actuator according to the present invention. In this figure, 100 is an electric actuator attached to a valve 200, such as a ball valve or a butterfly valve, or the like, and integrated together as an electric regulator valve. Moreover, information is exchanged with an external controller 300.

The electric actuator 100 is provided with a controlling circuit 1, a non-volatile memory 2, an A/D converting circuit 3, a communicating circuit 4, a multiplexer 5, an opening command inputting circuit 6, an electric motor 7, a motor driving circuit 8, a speed reducing mechanism 9, a position detecting mechanism (potentiometer) 10, a temperature sensor 11, a power supply circuit 12, a power supply outage detecting circuit 13, a power supply switching circuit 14, a control power supply circuit 15, a backup capacitor (electric double layer capacitor) 16, a capacitor terminal voltage measuring circuit 17, a charging circuit 18, a discharging circuit 19, and a discharging current measuring circuit 20.

The controlling circuit 1 is provided with a central calculation processing device (CPU), and performs processing operations following a program that is stored in the non-volatile memory 2. A program for controlling the degree of opening of the valve plug in the valve 200 is stored in the non-volatile memory 2. Moreover, adjusting data and setting data that are used in the processing operations by the controlling circuit (CPU) 1 in accordance with the aforementioned program are stored in the non-volatile memory 2. Moreover, also stored in the non-volatile memory 2 are measurement data obtained in the processing operations of the controlling circuit (CPU) 1 following the programs described above.

A setting value for the degree of opening of the valve (a setting opening) is applied to the controlling circuit (CPU) 1 from an external controller 300 through the opening command inputting circuit 6, the multiplexer 5, and the A/D converting circuit 3, where the actual measured value for the degree of opening of the valve (the actual opening) from the position detecting mechanism 10 is applied to the controlling circuit (CPU) 1 through the multiplexer 5 and the A/D converting circuit 3.

The controlling circuit (CPU) 1 compares the setting opening and the actual opening from the A/D converting circuit 3, and sends a driving command to the motor driving circuit 8 so as to cause the setting opening and the actual opening to match. Doing so causes the electric motor 7 to be driven, where the driving force of the electric motor 7 is transmitted to the valve shaft of the valve 200 through the speed reducing mechanism 9, to act on the valve plug that is secured to the valve shaft, to thereby adjust the degree of opening of the valve 200. The position detecting mechanism 10 detects the amount of dislocation of the valve shaft of the valve 200 through the speed reducing mechanism 9, to send the degree of opening of the valve, as the measured value (actual opening), to the multiplexer 5.

The communicating circuit 4 exchanges data communications with the external controller 300, to input into and output from the controlling circuit (CPU) 1. The opening command inputting circuit 6 inputs an opening command (an analog value) from the external controller 300, and outputs it to the multiplexer 5. The power supply circuit 12 generates a DC power supply from an AC power supply. The power supply switching circuit 14 selectively outputs a DC voltage from the power supply circuit 12 during normal operations, and selectively outputs a DC voltage (the charging voltage) from the backup capacitor 16 at the time of a power outage. The control power supply circuit 15 converts the DC voltage from the power supply switching circuit 14 into various voltages, which are supplied as control power supplies to individual circuits. The power supply outage detecting circuit 13 detects an interruption (a stoppage) in the supply of the AC power supply to the power supply circuit 12, and provides notification of such an event to the power supply switching circuit 14 and the controlling circuit (CPU) 1.

The charging circuit 18 inputs the DC voltage from the power supply circuit 12, to charge the backup capacitor 16. The charging timing and the charging current value Ia in the charging circuit 18 for the backup capacitor 16 are directed by the controlling circuit (CPU) 1. The discharging circuit 19 performs discharging of the backup capacitor 16. The discharging timing and discharging current value Ib in the discharging circuit 19 to the backup capacitor 16 are directed by the controlling circuit (CPU) 1.

The discharging current measuring circuit 20 detects the discharging current in the discharging circuit 19 and outputs it to the multiplexer 5. The capacitor terminal voltage measuring circuit 17 measures the terminal voltage of the backup capacitor 16 and outputs it to the multiplexer 5. The temperature sensor 11 detects the temperature within the device (the temperature in the vicinity of the backup capacitor 16) and outputs it to the multiplexer 5. The multiplexer 5 switches between the various outputs from the temperature sensor 11, the opening command inputting circuit 6, the discharging current measuring circuit 20, the capacitor terminal voltage measuring circuit 17, and the position detecting mechanism 10, to output them to the A/D converting circuit 3.

Figure 2:
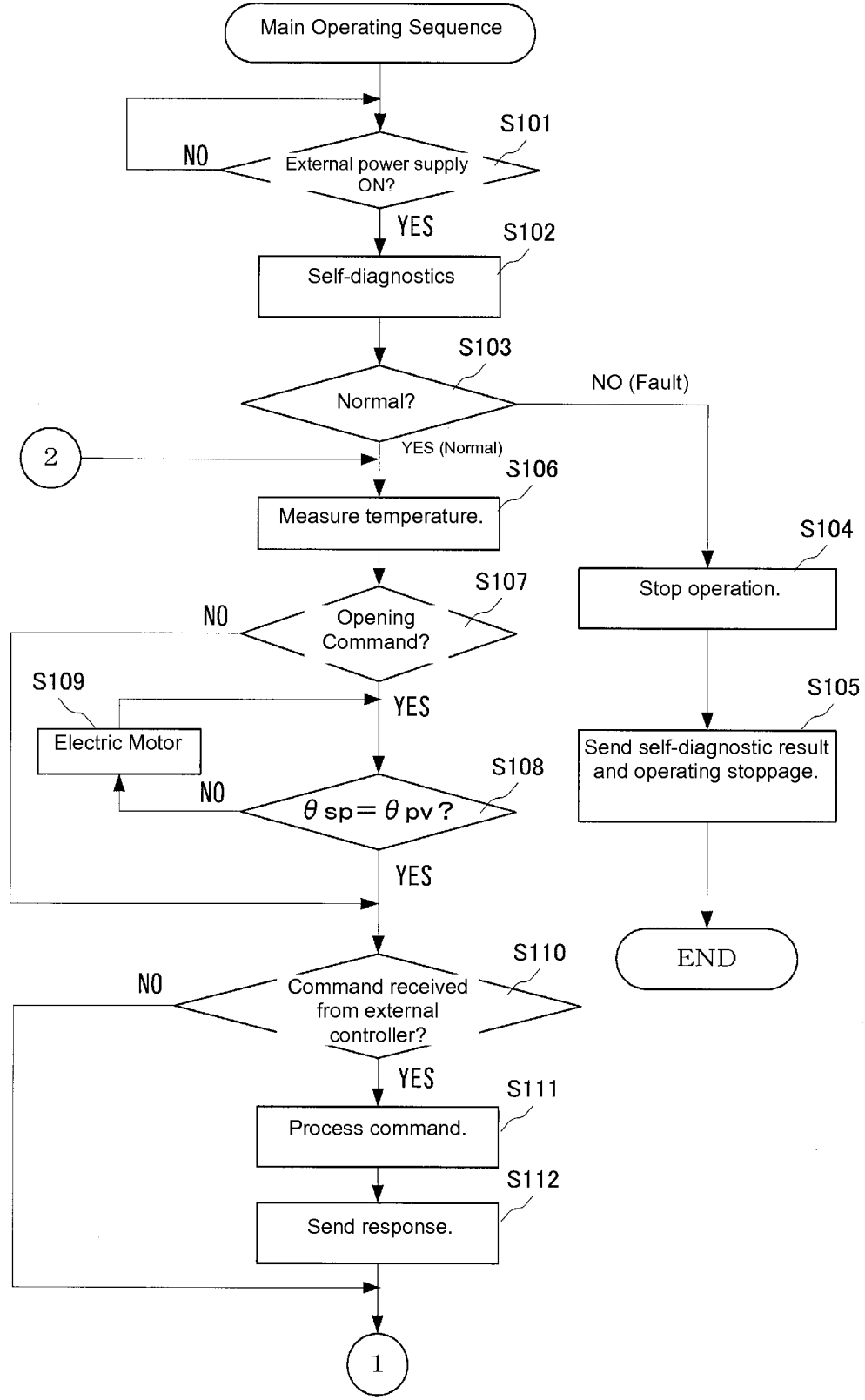
FIG. 2 is a flowchart illustrating the processes of an operating sequence that is executed by a control circuit in the electric actuator.
Figure 3:
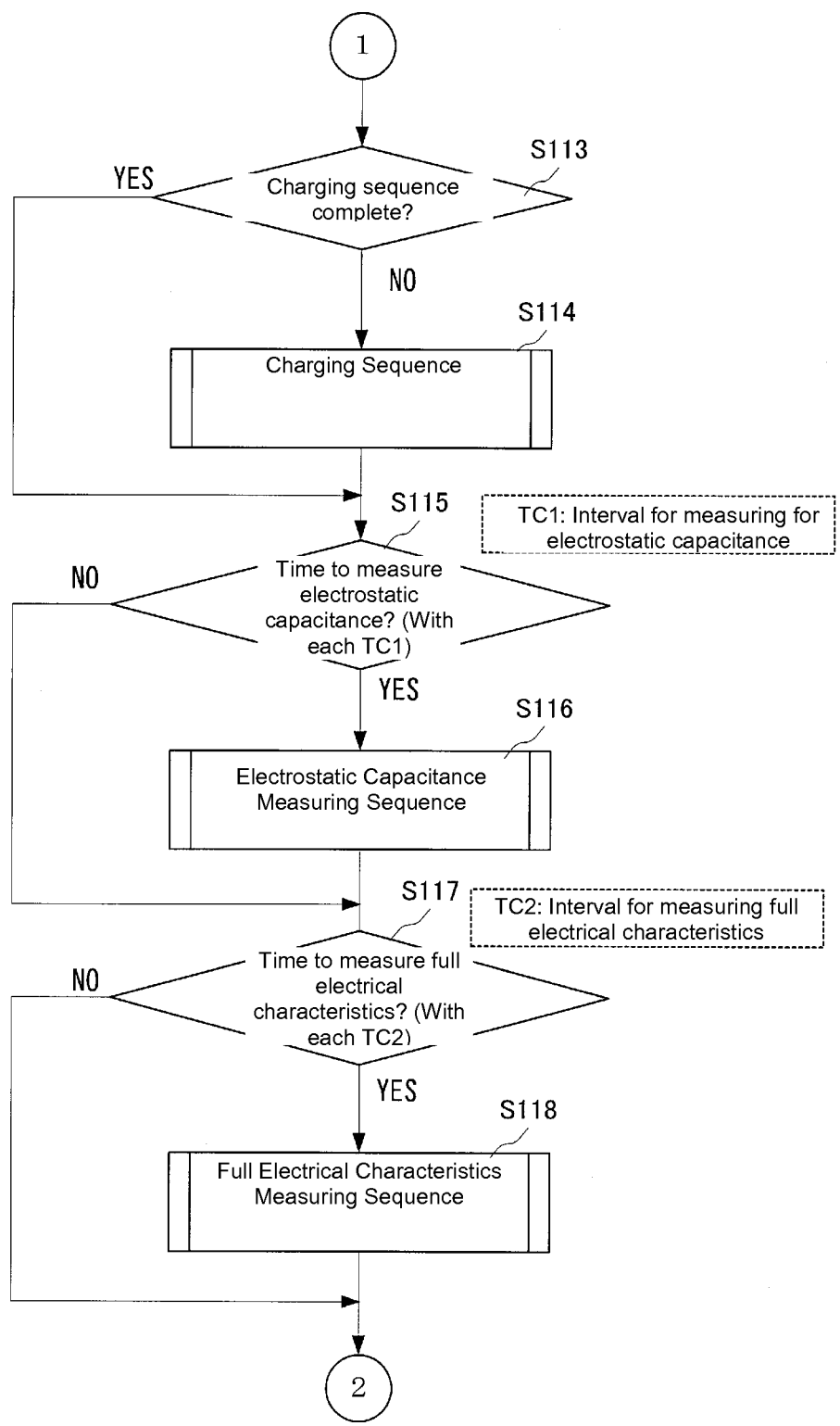
FIG. 3 is a flowchart illustrating the processes of the operating sequence, continuing from FIG. 2.

The flowchart of the processing operations that are executed by the controlling circuit (CPU) 1 in accordance with the program that is stored in the non-volatile memory 2 (the flowchart of the main operating sequence) is illustrated divided into FIG. 2 and FIG. 3. The processing operations executed by the controlling circuit (CPU) 1 are explained below, following this flowchart.

The controlling circuit (CPU) 1, when the power supply is turned ON (Step S101: YES), performs self diagnostics on the various portions within the electric actuator 100 (Step S102), and if the results of the self diagnostics are "Fault" (Step S103: NO), stops the operation of the electric actuator 100 (Step S104), and sends, to the external controller 300, through the communicating circuit 4, the result of the self diagnostics and information indicating that the operation has been terminated (Step S105).

If the result of the self diagnostics is "Normal" (Step S103: YES), then the controlling circuit (CPU) 1 reads in the temperature within the device, detected by the temperature sensor 11 (Step S106). Following this, it checks whether or not there is an opening command from the external controller 300 (Step S107), and if there is no opening command (Step S107: NO), immediately advances to Step S110.

If there is an opening command (Step S107: YES), then the setting value for the degree of valve opening (the setting opening) θsp that is applied by the opening command and the actual measured value for the degree of opening of the valve (the actual opening) θpv from the position detecting mechanism 10 are compared (Step S108), and a driving command is sent to the motor driving circuit 8 to drive the electric motor 7 to cause the setting opening θsp and the actual opening θpv to match (Step S109). When, as a result, the setting opening θsp and the actual opening θpv match (Step S108: YES), processing advances to Step S110.

In Step S110 the controlling circuit (CPU) 1 checks whether or not a command has been received from the external controller 300. If no command has been received from the external controller 300 (Step S110: NO), then processing advances to Step S113 (FIG. 3). If a command has been received from the external controller 300 (Step S110: YES), then the processes of that command are executed (Step S111). Following this, a response is sent to the external controller 300 (Step S112), and processing advances to Step S113 (FIG. 3).

The controlling circuit (CPU) 1, in Step S113, checks whether or not the charging sequence has been completed. If the charging sequence has not been completed (Step S113: NO), then the charging sequence is executed (Step S114).

Figure 4:
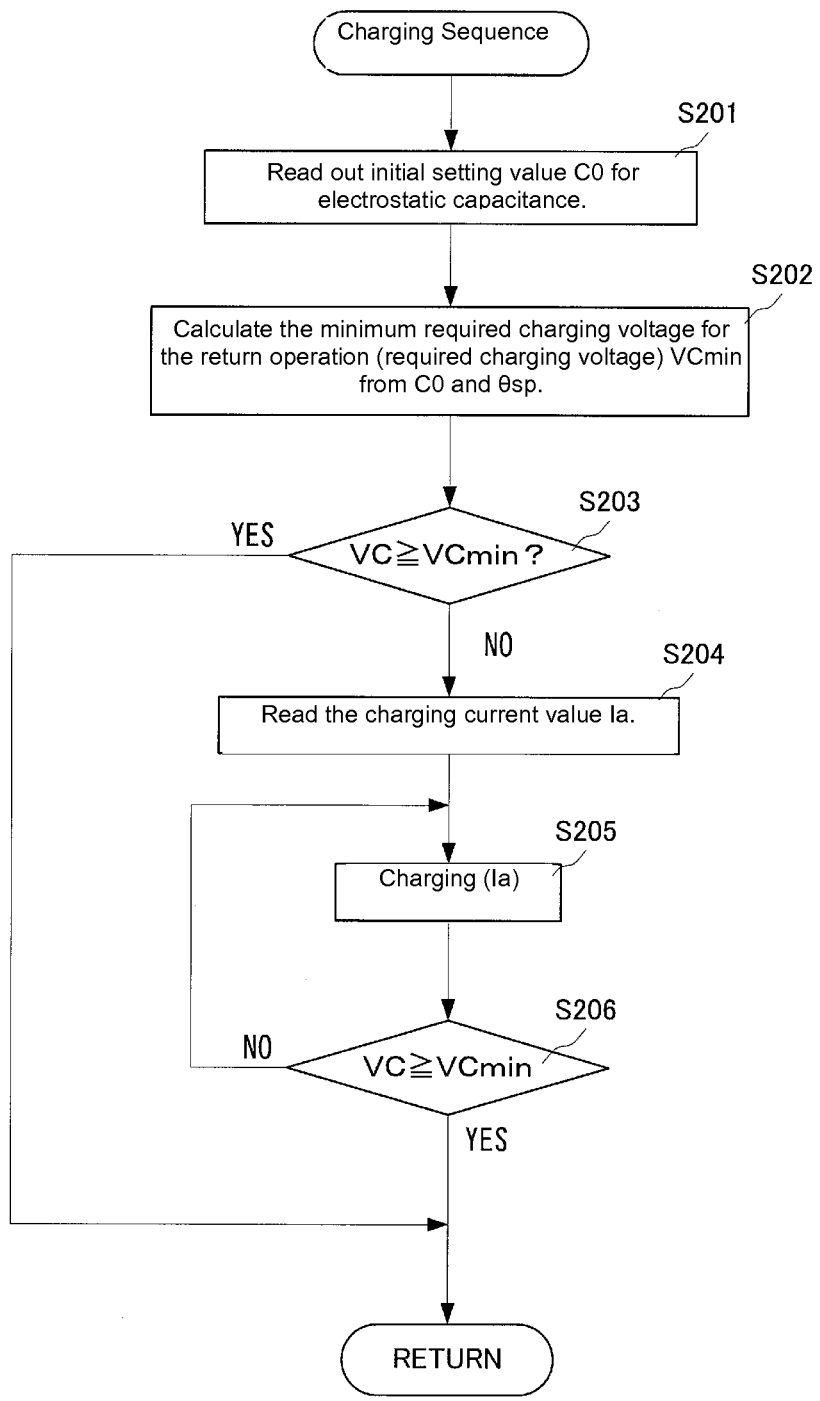
FIG. 4 is a flowchart illustrating the processes in a charging sequence that is executed in the processes of the operating sequence.

FIG. 4 shows a flowchart of the charging sequence that is executed in Step S114. In the charging sequence, the controlling circuit (CPU) 1 reads out an initial setting value C0 for the electrostatic capacitance of the backup capacitor 16 that is stored as setting data in the non-volatile memory 2 (Step S201). After this, it calculates, from the initial setting value C0 for the electrostatic capacitance, which has been read out, and from the setting opening θsp at that time, the minimum charging voltage for the backup capacitor 16 required for producing the return operation from the setting opening θsp at that time to the emergency opening/closing position, as the required charging voltage VCmin (Step S202).

Note that in the present example, the emergency opening/closing position is the fully closed position. Moreover, with the power of the electric motor 7 as P, the total driving time from the valve 200 being fully closed until being fully open as Ta, and the total rotational angle from the valve 200 being fully closed to being fully open as θa, the required charging voltage VCmin is calculated, through Equation (1), below, from the initial setting value C0 for the electrostatic capacitance, which has been read out, and the setting opening θsp at that time:

$$VCmin=(2P \cdot Ta \cdot \theta sp/(C0 \cdot \theta a))^{1/2} \quad (1)$$

Given this, the controlling circuit (CPU) 1 compares the measured value VC for the terminal voltage of the backup capacitor 16 to the required charging voltage VCmin, calculated in Step S202 (Step S203), and if the measured value VC for the terminal voltage is not equal to or greater than the required charging voltage VCmin (Step S203: NO), reads out the charging current value Ia that is stored as the setting data in the non-volatile memory 2 (Step S204) and applies a command to the charging circuit 18, to charge the backup capacitor 16 with the charging current value Ia that has been read out (Step S205). After this, it confirms that the measured value VC for the terminal voltage has become equal to or greater than the required charging voltage VCmin (Step S206: YES), and then returns to the main operating sequence. Note that if, in Step S203, the measured value VC for the terminal voltage is greater than or equal to the required charging voltage VCmin, then processing returns immediately to the main sequence, without performing the processes in Step S204 and beyond.

Figure 5:
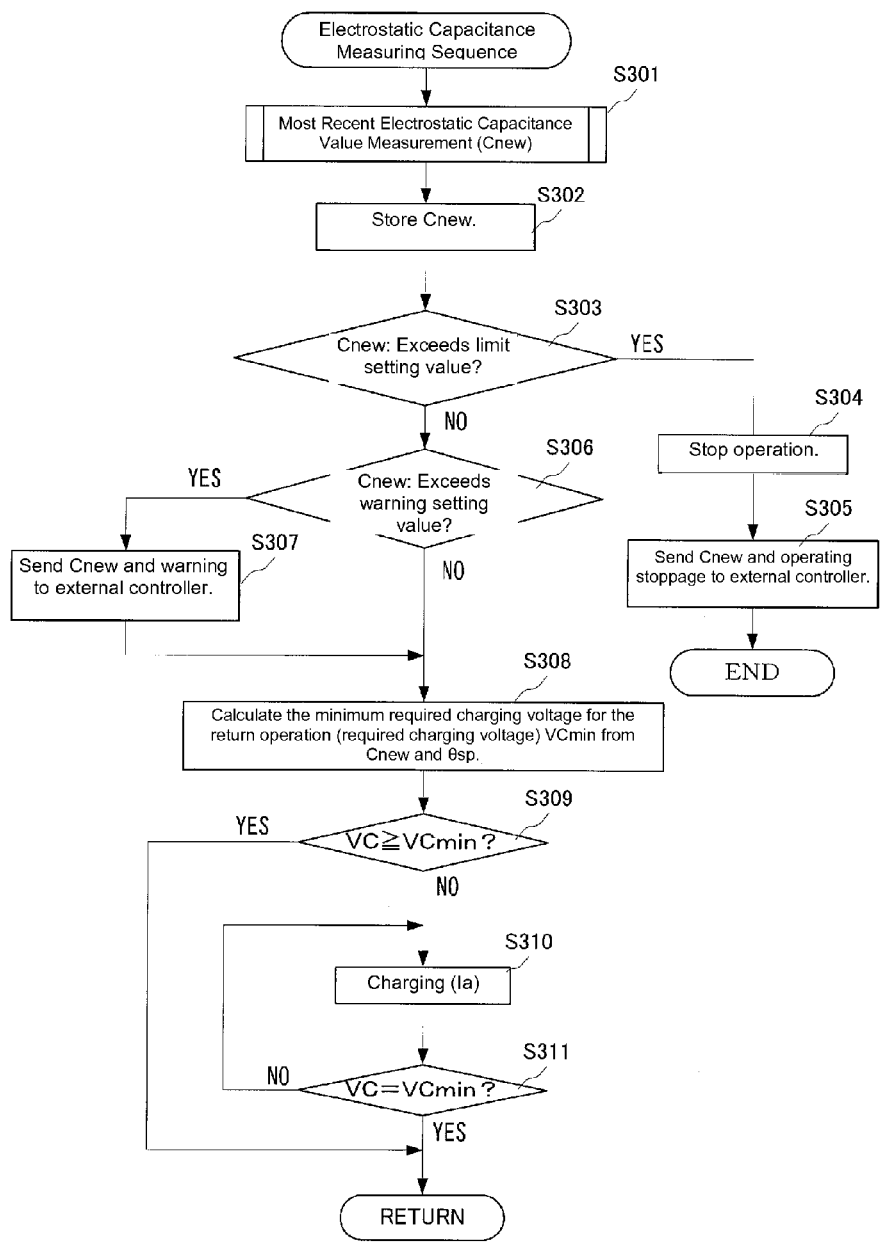
FIG. 5 is a flowchart illustrating the processes of an electrostatic capacitance measuring sequence that is executed in the processes of the operating sequence.

The controlling circuit (CPU) 1, in Step S115 (FIG. 3), checks whether or not it is time to measure the electrostatic capacitance. In the present example, the time interval for measuring the electrostatic capacitance is defined as TC1, and each time TC1 elapses, there is an occurrence of the time for measuring the electrostatic capacitance. When the time for measuring the electrostatic capacitance occurs (Step S115: YES), then the controlling circuit (CPU) 1 executes the processes in the electrostatic capacitance measuring sequence (Step S116). FIG. 5 shows a flowchart for the electrostatic capacitance measuring sequence executed in Step S116.

Figure 6:
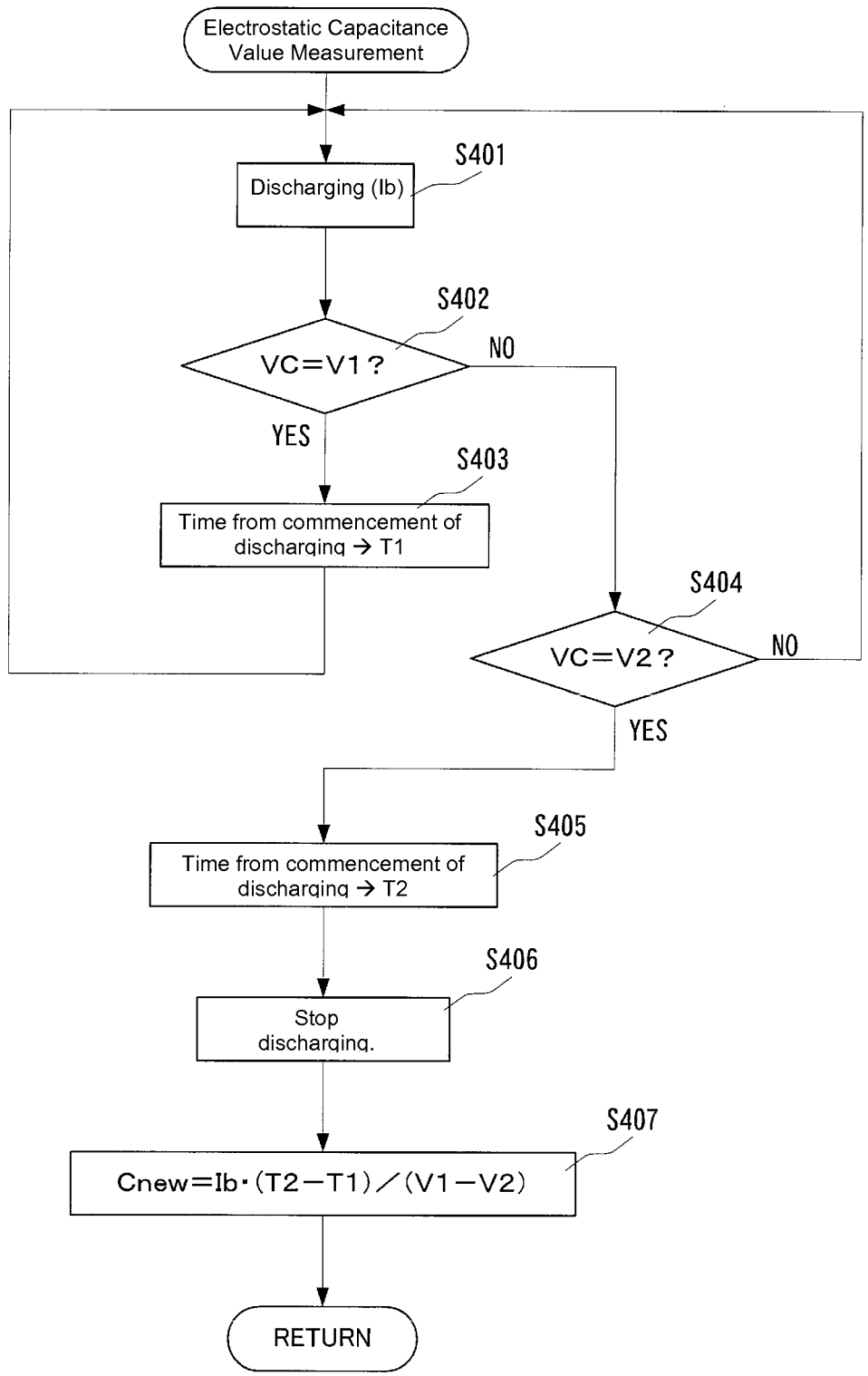
FIG. 6 is a flowchart illustrating the processes of the electrostatic capacitance value measurement that is performed in the processes of the electrostatic capacitance measuring sequence.

In this electrostatic capacitance measuring sequence, the controlling circuit (CPU) 1 first measures the most recent electrostatic capacitance value Cnew of the backup capacitor 16 (Step S301). The measurement of the most recent electrostatic capacitance value Cnew for the backup capacitor 16 is performed as described below. FIG. 6 shows a flowchart for the processes for the electrostatic capacitance measurement executed in Step S301.

Figure 7:
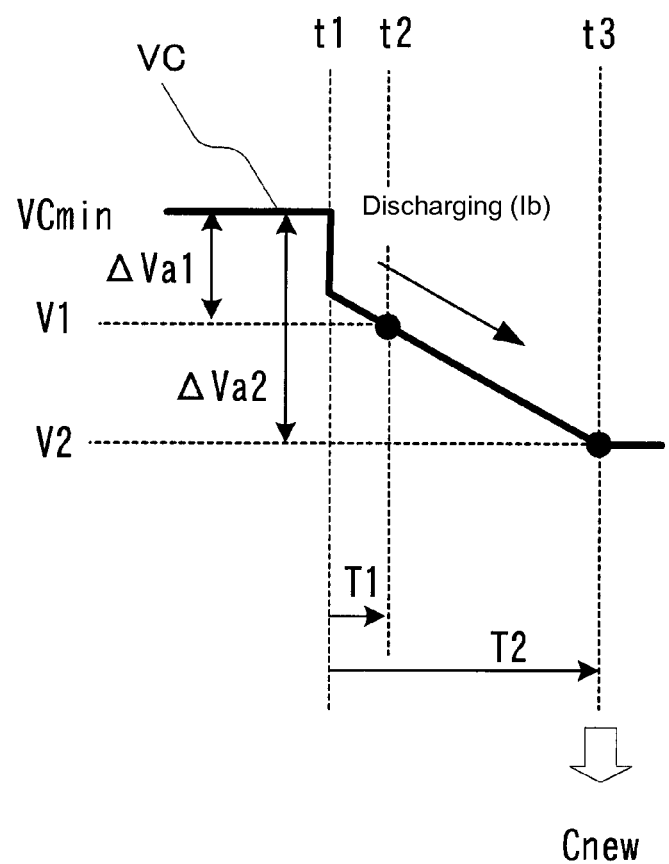
FIG. 7 is a diagram illustrating the changes in the terminal voltage of the backup capacitor at the time of the electrostatic capacitance value measurement.

The controlling circuit (CPU) 1 reads out the discharging current value Ib that is stored as setting data in the non-volatile memory 2, and applies a command to the discharging circuit 19, to discharge the backup capacitor 16 at the discharging current value Ib that has been read out (Step S401: point t1 shown in FIG. 7).

Given this, the terminal voltage VC of the backup capacitor 16, which drops due to this discharge, is monitored, and at the point in time that the terminal voltage VC has reached a specific voltage value V1 (Step S402: YES, point t2 shown in FIG. 7), the time T1 that has elapsed from the commencement of the discharge is measured (Step S403). Moreover, the time T2 that has elapsed since the commencement of discharge at the point in time at which the terminal voltage VC of the backup capacitor 16 has arrived at a specific voltage value V2, which is set to a value that is lower than the voltage value V1, (Step S404: YES, point t3 shown in FIG. 7) is measured (Step S405).

Following this, the discharging is stopped (Step S406), and the most recent electrostatic capacitance value Cnew for the backup capacitor is calculated from the measured times T1 and T2, the discharging current value Ib, and the voltage values V1 and V2, as Cnew=Ib·(T2−T1)/(V1−V2) (Step S407).

The controlling circuit (CPU) 1, after calculating the most recent electrostatic capacitance value Cnew in this way, stores the calculated most recent electrostatic capacitance value Cnew in the non-volatile memory 2 (Step S302).

Following this, the controlling circuit (CPU) 1 compares the most recent electrostatic capacitance value Cnew, measured in Step S301, to a limit setting value that is stored as setting data in the non-volatile memory 2 (Step S303), and if the most recent electrostatic capacitance value Cnew exceeds the limit setting value (Step S303: YES), then the operation of the electric actuator 100 is stopped (Step S304), and information indicating the most recent electrostatic capacitance value Cnew and indicating that the operation has been stopped is sent to the external controller 300 (Step S305).

If the most recent electrostatic capacitance value Cnew does not exceed the limit setting value (Step S303: NO), then the controlling circuit (CPU) 1 performs a comparison to a warning setting value that is stored as setting data in the non-volatile memory 2 (Step S306). Here if the most recent electrostatic capacitance value Cnew exceeds the warning setting value (Step S306: YES), then the most recent electrostatic capacitance value Cnew and information indicating that attention is required is sent to the external controller 300 (Step S307).

Following this, the controlling circuit (CPU) 1 calculates, as the required charging voltage VCmin, the minimum required charging voltage for the backup capacitor 16 in order to perform the return operation from the setting opening θsp at that time to the emergency opening/closing position (the fully closed position), based on the measured most recent electrostatic capacitance value Cnew and the setting opening θsp at that time (step S308).

In this case, with the power of the electric motor 7 as P, the total driving time from the valve 200 being fully closed to the valve 200 being fully open as Ta, and the total rotational angle from the valve 200 being fully closed to the valve 200 being fully open as θa, the required charging voltage VCmin is calculated through Equation (2), below, from the measured most recent electrostatic capacitance value Cnew and the setting opening θsp at that time:

$$VCmin=(2P \cdot Ta \cdot \theta sp/(Cnew \cdot \theta a))^{1/2} \quad (2)$$

Figure 8:
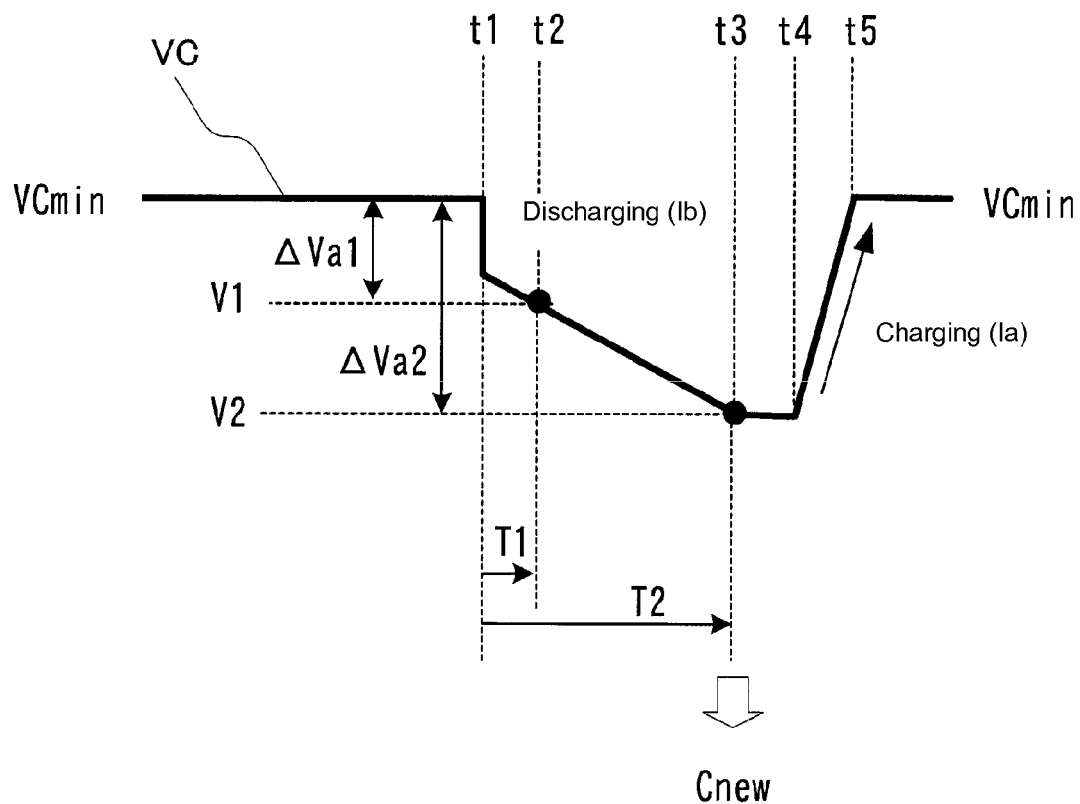
FIG. 8 is a diagram illustrating the state wherein the terminal voltage of the backup capacitor is adjusted to the required charging voltage after the electrostatic capacitance value measurement.

Given this, the controlling circuit (CPU) 1 compares the measured value VC for the terminal voltage of the backup capacitor 16 to the required charging voltage VCmin, calculated in Step S308 (Step S309), and if the measured value VC for the terminal voltage is lower than the required charging voltage VCmin (Step S309: NO), reads out the charging current value Ia from the non-volatile memory 2 and applies a command to the charging circuit 18, to charge the backup capacitor 16 with the charging current value Ia that has been read out (Step S310, point t4 shown in FIG. 8). In addition, when the measured value VC for the terminal voltage reaches the required charging voltage VCmin (Step S311: YES, point t5 shown in FIG. 8), then the electrostatic capacitance measuring sequence is complete, and processing returns to the main operating sequence.

If the measured value VC for the terminal voltage is equal to or greater than the required charging voltage VCmin (Step S309: YES), then the electrostatic capacitance measuring sequence is terminated, and processing returns to the main operating sequence.

Following this, the controlling circuit (CPU) 1 checks whether or not it is time to measure the full electrical characteristics (Step S117 (FIG. 3)). In the present example, the interval for measuring the full electrical characteristics is defined as TC2, where a time for measuring the full electrical characteristics occurs each time TC2 elapses. When the timing for measuring the full electrical characteristics occurs (Step S117: YES), the controlling circuit (CPU) 1 executes the processes in the full electrical characteristics measuring sequence (Step S118). Note that in the present example, the interval TC2 for measuring the full electrical characteristics is set so as to be longer than the interval TC1 for measuring the electrostatic capacitance.

Figure 9:
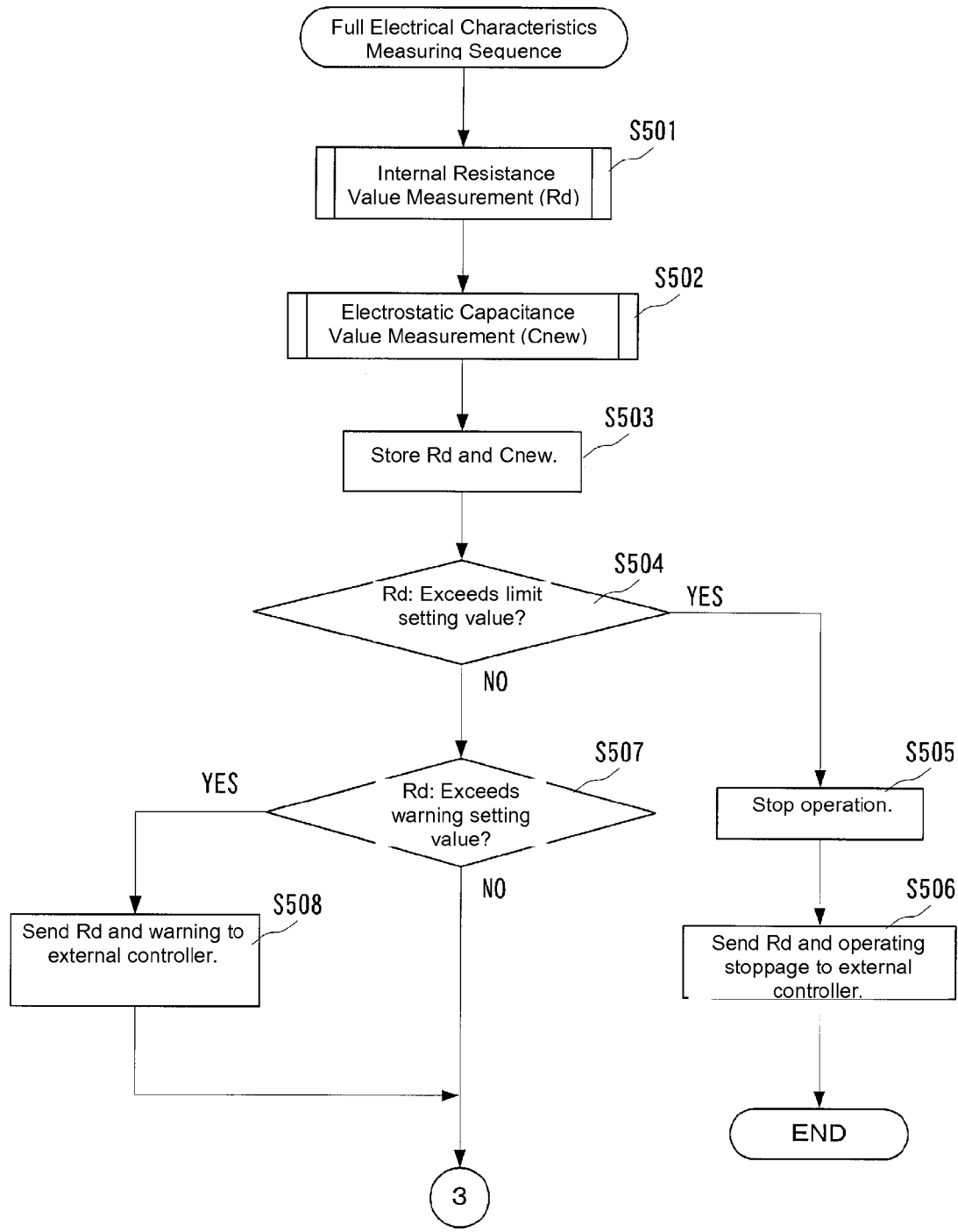
FIG. 9 is a flowchart illustrating the processes in the electrical characteristics measuring sequence that is performed in the processes of the main operating sequence.
Figure 10:
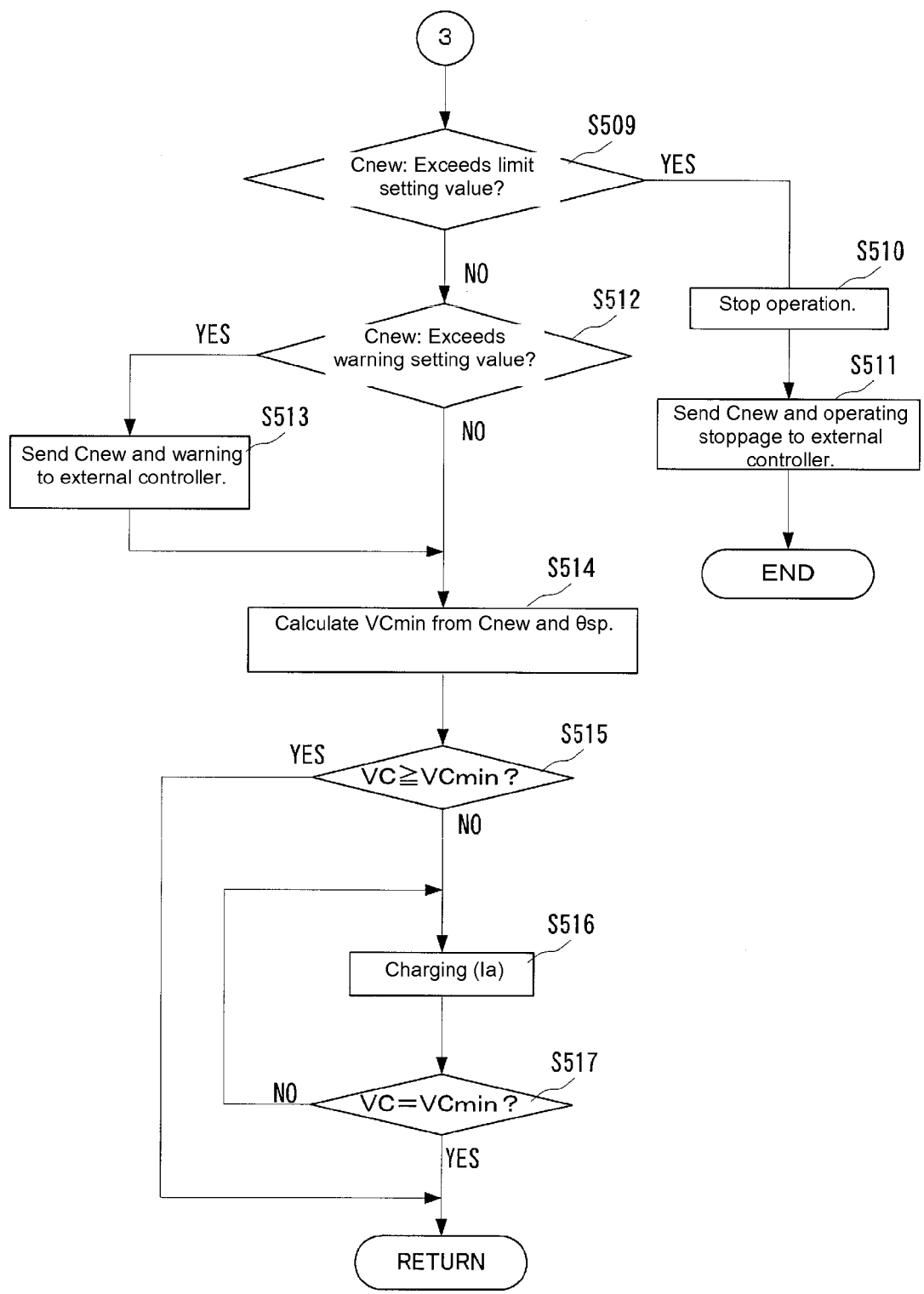
FIG. 10 is a flowchart illustrating the processes in the electrical characteristics measuring sequence, continuing from FIG. 9.
Figure 11:
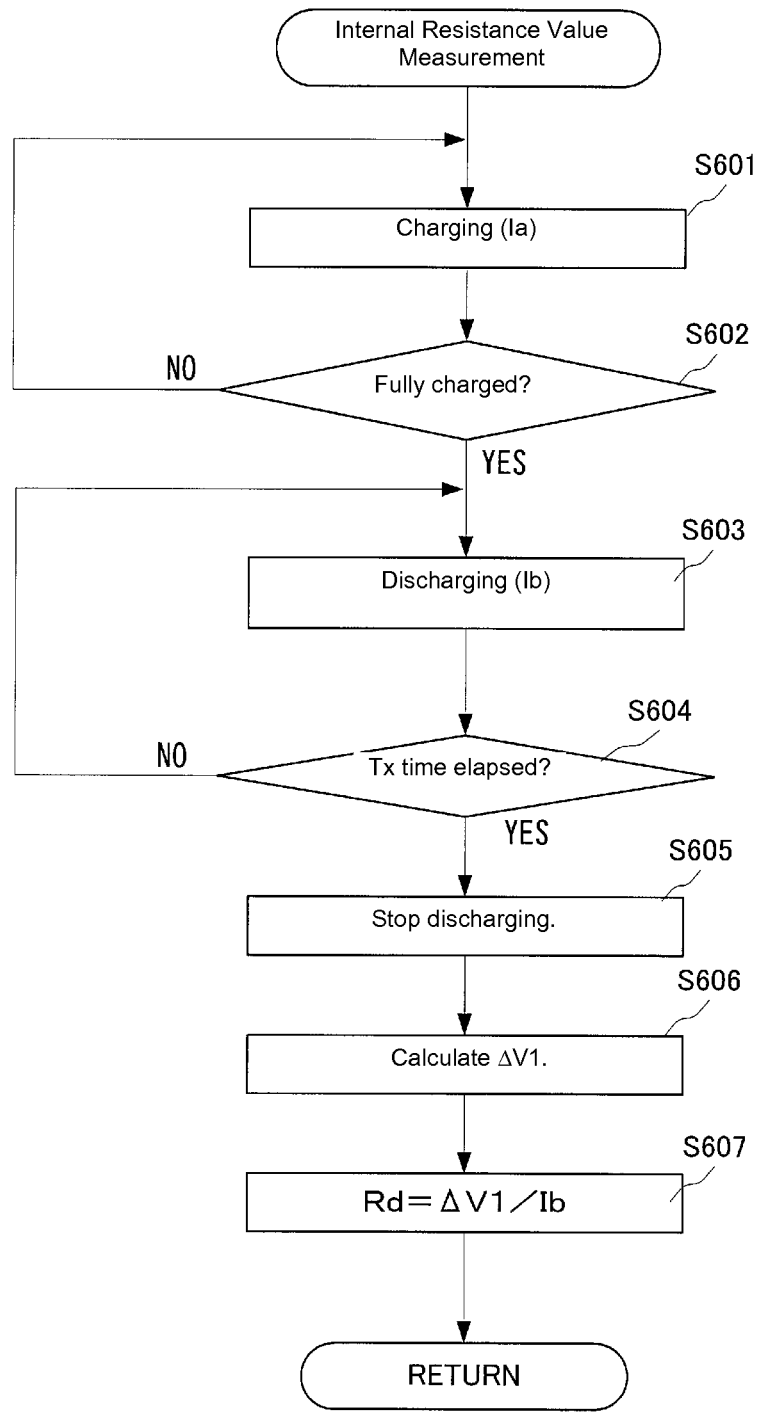
FIG. 11 is a flowchart illustrating the processes for the internal resistance value measurement that is performed in the electrical characteristics measuring sequence.

A flowchart for the full electrical characteristics measuring sequence that is executed in Step S118 is shown divided between FIG. 9 and FIG. 10. In the full electrical characteristics measuring sequence, the controlling circuit (CPU) 1 first measures the internal resistance value Rd of the backup capacitor 16 (Step S501). The measurement of the internal resistance value Rd of the backup capacitor 16 is performed as follows. FIG. 11 shows a flowchart of the processes for the internal resistance value measurement in Step S501.

Figure 12:
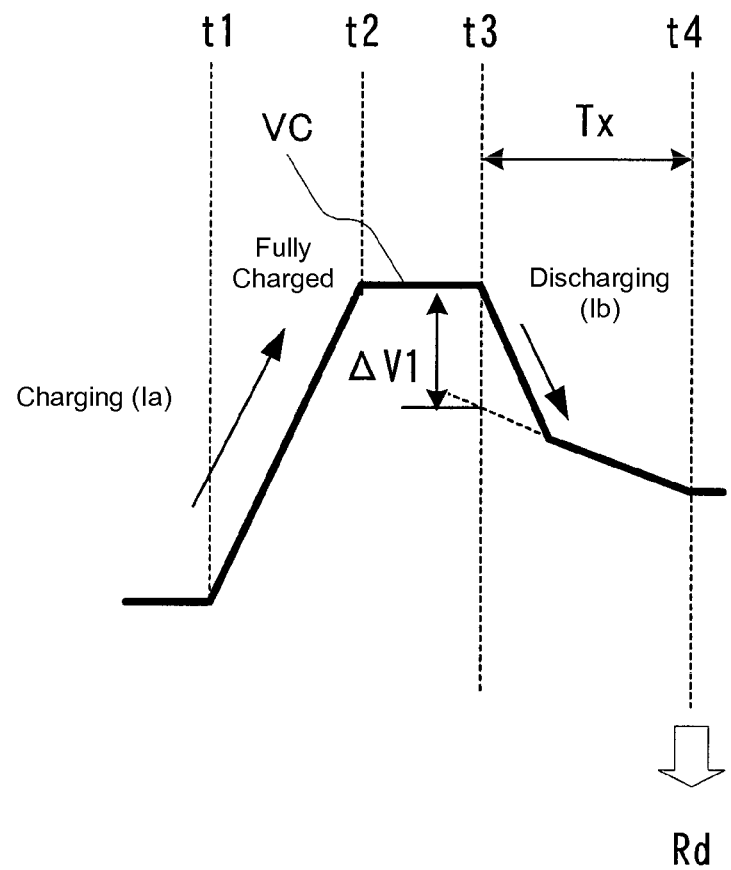
FIG. 12 is a diagram illustrating the changes in the terminal voltage of the backup capacitor at the time of the internal resistance value measurement.

The controlling circuit (CPU) 1 reads out the charging current value Ia that is stored in the non-volatile memory 2, and applies a command to the charging circuit 18 so as to charge the backup capacitor 16 at the charging current value Ia that has been read out (Step S601: point t1 shown in FIG. 12). Following this, after confirming that the backup capacitor 16 is fully charged (Step S602: YES, point t2 shown in FIG. 12), it reads out the discharging current value Ib that is stored in the non-volatile memory 2 and applies a command to the discharging circuit 19 so as to discharge the backup capacitor 16 at the discharging current value Ib that has been read out (Step S603: point t3 shown in FIG. 12).

The controlling circuit (CPU) 1 continues discharging at the discharging current value Ib, and when a predetermined time Tx has elapsed (Step S604: YES, point t4 shown in FIG. 12), the discharging is stopped (Step S605). Given this, a voltage drop ΔV1 at the part wherein there is a sharp decrease during this time interval Tx is calculated (Step S606), and the internal resistance value Rd of the backup capacitor 16 is calculated from the voltage drop ΔV1 and the discharging current value Ib as Rd=ΔV1/Ib (Step S607).

Following this, the controlling circuit (CPU) 1 measures the electrostatic capacitance value Cnew for the backup capacitor 16 (Step S502). The measurement of the electrostatic capacitance value Cnew of the backup capacitor 16 is performed following the flowchart shown in FIG. 6, in the same manner as in Step S301 shown in FIG. 5.

Figure 13:
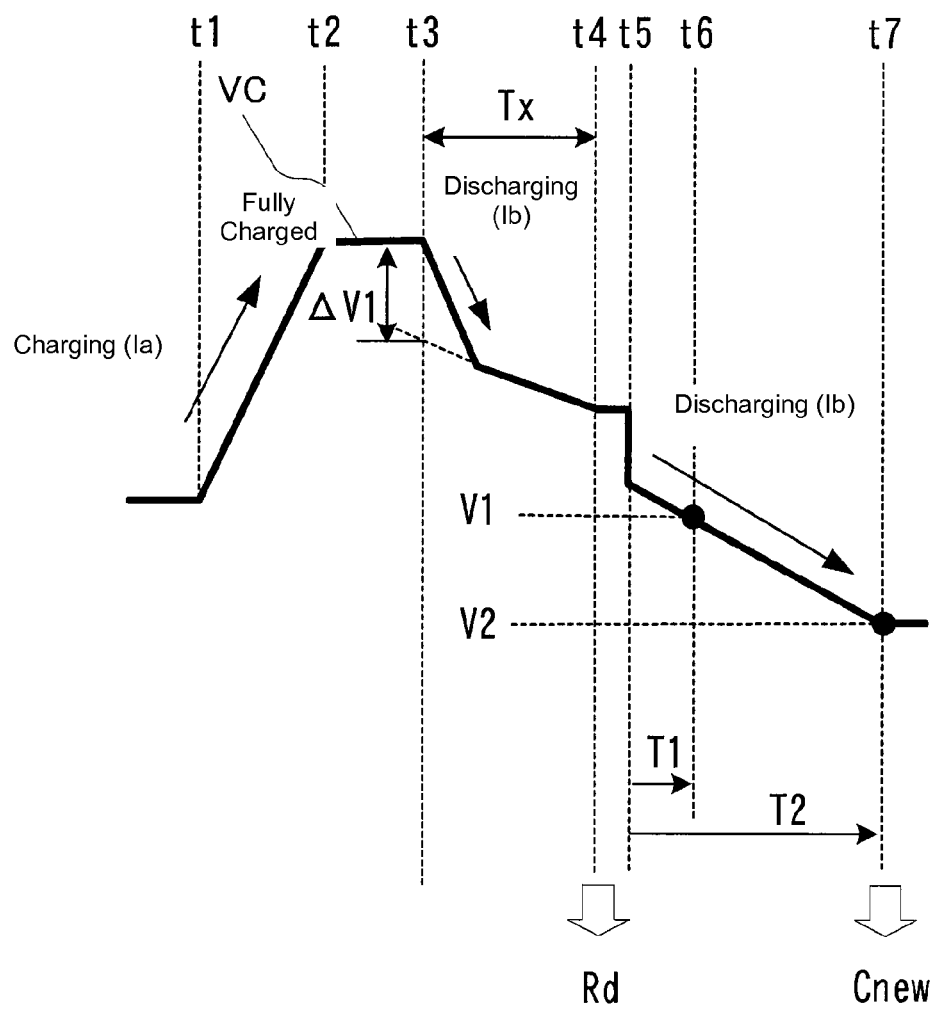
FIG. 13 is a diagram illustrating the changes in the terminal voltage of the backup capacitor at the time of the electrostatic capacitance value measurement after the internal resistance value measurement.

That is, in order to produce a change in the terminal voltage VC of the backup capacitor 16 after measuring the internal resistance Rd in FIG. 13, at the point t5, after the measurement of the internal resistance value Rd, discharging is commenced at the discharging current value Ib, and the time T1 since the commencement of discharging is measured at the point in time wherein the terminal voltage VC of the backup capacitor 16 reaches a prescribed voltage value V1 (time t6 shown in FIG. 13), and the time T2 since the commencement of discharging is measured at the point in time that a prescribed voltage value V2 is reached (point t7 shown in FIG. 13), and the electrostatic capacitance value Cnew of the backup capacitor 16 is calculated as Cnew=Ib·(T2−T1)/(V1−V2).

After calculating the internal resistance value Rd and the electrostatic capacitance value Cnew of the backup capacitor 16 in this way, the controlling circuit (CPU) 1 stores into the non-volatile memory 2 the calculated internal resistance value Rd and electrostatic capacitance value Cnew (Step S503).

Following this, the controlling circuit (CPU) 1 compares the measured internal resistance value Rd to a limit setting value that is stored as setting data in the non-volatile memory 2 (Step S504), and if the internal resistance value Rd exceeds the limit setting value (Step S504: YES), then the operation of the electric actuator 100 is stopped (Step S505), and information indicating the internal resistance value Rd and indicating that the operation has been stopped is sent to the external controller 300 (Step S506).

If the internal resistance value Rd does not exceed the limit setting value (Step S504: NO), then the controlling circuit (CPU) 1 performs a comparison to a warning setting value that is stored as setting data in the non-volatile memory 2 (Step S504). Here if the internal resistance value Rd exceeds the warning setting value (Step S507: YES), then the measured internal resistance value Rd and information indicating that attention is required is sent to the external controller 300 (Step S508).

Moreover, the controlling circuit (CPU) 1 compares the measured electrostatic capacitance value Cnew to a limit setting value that is stored as setting data in the non-volatile memory 2 (Step S509 (FIG. 10)), and if the electrostatic capacitance value Cnew exceeds the limit setting value (Step S509: YES), then the operation of the electric actuator 100 is stopped (Step S510), and information indicating the electrostatic capacitance value Cnew and indicating that the operation has been stopped is sent to the external controller 300 (Step S511).

If the electrostatic capacitance value Cnew does not exceed the limit setting value (Step S509: NO), then the controlling circuit (CPU) 1 performs a comparison to a warning setting value that is stored as setting data in the non-volatile memory 2 (Step S512). Here if the electrostatic capacitance value Cnew exceeds the warning setting value (Step S512: YES), then the electrostatic capacitance value Cnew and information indicating that attention is required is sent to the external controller 300 (Step S513).

Following this, the controlling circuit (CPU) 1 calculates, as the required charging voltage VCmin, the minimum required charging voltage for the backup capacitor 16 in order to perform the return operation from the setting opening θsp at that time to the emergency opening/closing position (the fully closed position), based on the measured electrostatic capacitance value Cnew and the setting opening θsp at that time (Step S514).

In this case, with the power of the electric motor 7 as P, the total driving time from the valve 200 being fully closed to the valve 200 being fully open as Ta, and the total rotational angle from the valve 200 being fully closed to the valve 200 being fully open as θa, the required charging voltage VCmin is calculated through the aforementioned Equation (2) from the measured electrostatic capacitance value Cnew and the setting opening θsp at that time.

Figure 14:
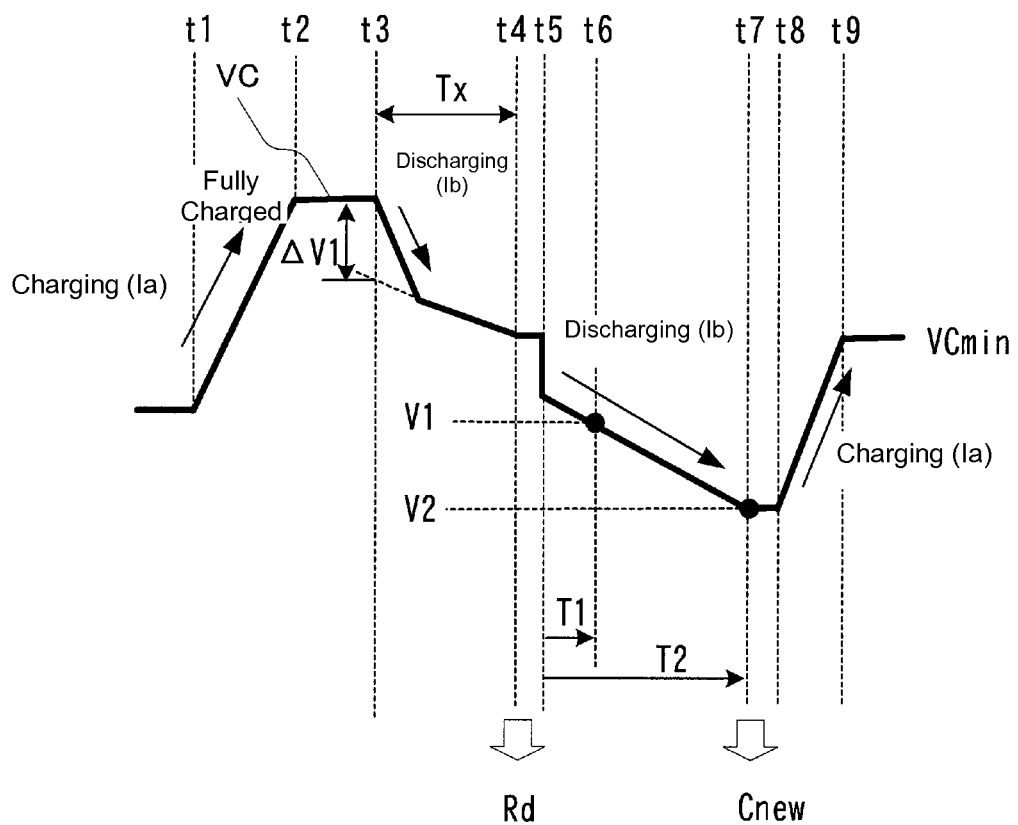
FIG. 14 is a diagram illustrating the state wherein the terminal voltage of the backup capacitor has been adjusted, through charging, to the required charging voltage after the electrostatic capacitance value measurement after the internal resistance value measurement.

Given this, the controlling circuit (CPU) 1 compares the measured value VC for the terminal voltage of the backup capacitor 16 to the required charging voltage VCmin, calculated in Step S514 (Step S515), and if the measured value VC for the terminal voltage is lower than the required charging voltage VCmin (Step S515: NO), reads out the charging current value Ia from the non-volatile memory 2 and applies a command to the charging circuit 18, to charge the backup capacitor 16 with the charging current value Ia that has been read out (Step S516, point t8 shown in FIG. 14). In addition, when the measured value VC for the terminal voltage reaches the required charging voltage VCmin (Step S517: YES, point t9 shown in FIG. 14), then the full electrical characteristics measuring sequence is complete, and processing returns to the main operating sequence.

If the measured value VC for the terminal voltage is equal to or greater than the required charging voltage VCmin (Step S515: YES), then the full electrical characteristics measuring sequence is terminated, and processing returns to the main operating sequence.

If, after the completion of the processes in Step S101 through 103 in the main operating sequence (FIG. 2 and FIG. 3), a "Normal" self-diagnostic result is obtained in Step S103, then the controlling circuit (CPU) 1 repeatedly executes the processes in Step S106 through S118, described above.

That is, if, in the repeating of the processes in Step S106 through S118 there is an opening command applied from the external controller 300 (Step S107: YES), then the electric motor 7 is driven to cause the actual opening θpv of the valve 200 to match the setting opening θsp, and if there is a command from the external controller 300 (Step S110: YES), then the processes of that command are executed.

Moreover, if the timing for measuring the electrostatic capacitance occurs (Step S115: YES), then the most recent electrostatic capacitance value Cnew for the backup capacitor 16 is measured, and along with checking whether or not the measured most recent electrostatic capacitance value Cnew is within the normal range, the required charging voltage VCmin is calculated based on this measured most recent electrostatic capacitance value Cnew, and the terminal voltage VC of the backup capacitor 16 is adjusted to the calculated required charging voltage VCmin.

Moreover, if the timing for measuring the full electrical characteristics occurs (Step S117: YES), then the internal resistance value Rd and the most recent electrostatic capacitance value Cnew for the backup capacitor 16 are measured, and along with checking whether or not the measured internal resistance value Rd and most recent electrostatic capacitance value Cnew are within the normal range, the required charging voltage VCmin is calculated based on this measured electrostatic capacitance value Cnew, and the terminal voltage VC of the backup capacitor 16 is adjusted to the calculated required charging voltage VCmin.

In this way, in the present example, the most recent electrostatic capacitance value Cnew of the backup capacitor 16 is measured periodically, and each time the most recent electrostatic capacitance value Cnew of the backup capacitor 16 is measured, the charging voltage of the backup capacitor that is required in order to cause a return operation of the valve 200 from the opening setting value θsp at that time to the emergency opening/closing position is calculated, as the required charging voltage VCmin, based on the most recent electrostatic capacitance value Cnew that has been measured, and the terminal voltage VC of the backup capacitor 16 is adjusted so as to go to the required charging voltage VCmin that has been calculated, thus making it possible to ensure the reliability of the desired return operation, regardless of when a power outage may occur, while storing an appropriate amount of electrical energy in the backup capacitor 16. This eliminates any failures in operation at the time of a power outage and achieves a reduction in energy.

Note that in the present example, the measuring interval TC1 for the electrostatic capacitance and the measuring interval TC2 for the full electrical characteristics may be set to optimal measuring intervals, varied depending on the situations described below, to reduce the frequency of charging and discharging at the time of measurement, to thereby increase the service life:

(1) The state of degradation of the internal resistance value and the electrostatic capacitance value:

Little degradation in the internal resistance/electrostatic capacitance→long measurement interval Much degradation in the internal resistance/electrostatic capacitance→short measurement interval (2) The state of temperature within the device:

Internal temperature is low→long measurement interval

Internal temperature is high→short measurement interval

Moreover, if, in the present example, the charging cannot keep up with changes in the setting opening θsp in some number of cycles during charging, the charging current value may be increased automatically.

While the present invention has been explained above in reference to the examples above, the present invention is not limited to those examples. The structures and details in the present invention may be varied in a variety of ways, as can be understood by one skilled in the art, within the scope of technology in the present invention.

What is claimed is:

1. An electric actuator comprising a motor receiving a supply of electric power from a power supply portion and driving a valve, and a backup capacitor that is charged through the receipt of electric power from the power supply, performing a return operation, at the time of a power outage, on the valve to a prescribed opening position through forcibly driving the motor through electrical energy that is stored in the backup capacitor, comprising:

an electrostatic capacitance measuring unit measuring periodically a most recent electrostatic capacitance value for the backup capacitor; and a charging voltage calculating and adjusting unit calculating, as a required charging voltage, a charging voltage for the backup capacitor that is required in order to cause the return operation of the valve from the opening setting value at that time to the prescribed opening position, based on the measured most recent electrostatic capacitance value, each time the most recent electrostatic capacitance value of the backup capacitor is measured and adjusting the terminal voltage of the backup capacitor so as to become equal to the calculated required charging voltage.

2. The electric actuator as set forth in claim 1, wherein:

the electrostatic capacitance measuring unit discharges the electrical energy that is stored in the backup capacitor at a prescribed discharging current value Ib, monitors the terminal voltage of the backup capacitor, which falls due to the discharge, measures a time T1 since the commencement of discharge, at the point in time wherein the terminal voltage reaches a specific voltage value V1, and a time T2 since the commencement of discharge, at the point in time at which a specific voltage value V2, set to be a value that is lower than the voltage value V1, is reached, and calculates the most recent electrostatic capacitance value of the backup capacitor based on these measured times T1 and T2, the discharging current value Ib, and the voltage values V1 and V2.

3. The electric actuator as set forth in claim 2, wherein:

the electrostatic capacitance measuring unit calculates the most recent electrostatic capacitance value of the backup capacitor as $C_{new} = I_b \cdot (T2-T1)/(V1-V2)$; and the charging voltage calculating and adjusting unit calculates the required charging voltage as $V_{Cmin} = (2P \cdot T_a \cdot \theta_{sp}/(C_{new} \cdot \theta_a))^{1/2}$ with the motor power as P, the total driving time from the valve being fully closed to the valve being fully open as Ta, the valve opening setting value as θsp, the total rotational angle from the valve being fully closed to the valve being fully open as θa, and the most recent electrostatic capacitance value of the backup capacitor as Cnew.

4. The electric actuator as set forth in claim 1, comprising:

a use limit threshold value storing unit storing a use limit threshold value for the electrostatic capacitance of the backup capacitor; and an electrostatic capacitance diagnosing unit comparing a most recent electrostatic capacitance value, measured by the electrostatic capacitance measuring unit, and the use limit threshold value, to provide notification if the most recent electrostatic capacitance value exceeds the use limit threshold value.

\* \* \* \* \*